United States Patent [19]

Evans et al.

[11] 3,951,015

[45] Apr. 20, 1976

[54] FUSE HANDLING TOOL

[75] Inventors: David M. Evans, Palatine; Edward J. Rogers, Chicago, both of Ill.

[73] Assignee: S & C Electric Company, Chicago, Ill.

[22] Filed: Apr. 1, 1975

[21] Appl. No.: 564,023

[52] U.S. Cl. .............................. 81/3.8; 337/177; 337/205
[51] Int. Cl.² .................................... B25B 27/14
[58] Field of Search ............ 81/3.8; 337/205, 177, 337/7, 8, 4; 200/50 AA

[56] References Cited
UNITED STATES PATENTS

| | | | |
|---|---|---|---|
| 3,573,559 | 9/1969 | Rogers | 200/50 AA |
| 3,576,509 | 4/1971 | Bernatt | 337/8 |
| 3,748,621 | 7/1973 | Sakats | 337/205 |
| 3,842,381 | 10/1974 | Bernatt et al. | 337/205 |

*Primary Examiner*—Al Lawrence Smith
*Assistant Examiner*—Roscoe V. Parker
*Attorney, Agent, or Firm*—Kirkland & Ellis

[57] ABSTRACT

Disclosed is a tool for removing and installing fuses in metal-enclosed switchgear. The switchgear includes one or more fuses and one or more isolating switches and operating mechanisms for isolating the fuses from a high voltage supply circuit. The fuses are mounted between disengageable contacts that connect the fuse between the supply circuit and a load circuit. Access ports are provided through a front panel of the switchgear and are aligned with the fuses for providing access to the fuses. A tool receiving receptacle is mounted on the front panel around the access ports. The tool comprises a hollow metal housing having a hollow interior and having a flange on one end for being received and retained by the receptacle. The receptacle aligns the hollow interior of the metal housing with the access port, and makes grounding connection from the housing to the front panel. The tool also comprises an operating portion including a handle mounted on one end of an insulator. Mounted on the other end of the insulator is a fuse engaging arrangement that engages the end of the fuse when the engaging arrangement is placed against the end of the fuse and the operating portion is rotated 180°. Rotation in the opposite direction disengages the fuse. The operating portion is adapted to be moved within the hollow metal housing so that the operating portion can be moved into the switchgear against the end of the fuse. The handle is also grounded to the housing so that the handle is at ground potential. Rotation of the tool also causes the isolating switch operating mechanism to open the isolating switch to isolate the fuse from the high voltage supply circuit so that the fuse can be removed from the switchgear for testing and/or replacement and then re-installed. Also, the tool can be used to operate auxiliary apparatus to indicate the condition of the isolating switch and the fuse.

18 Claims, 21 Drawing Figures

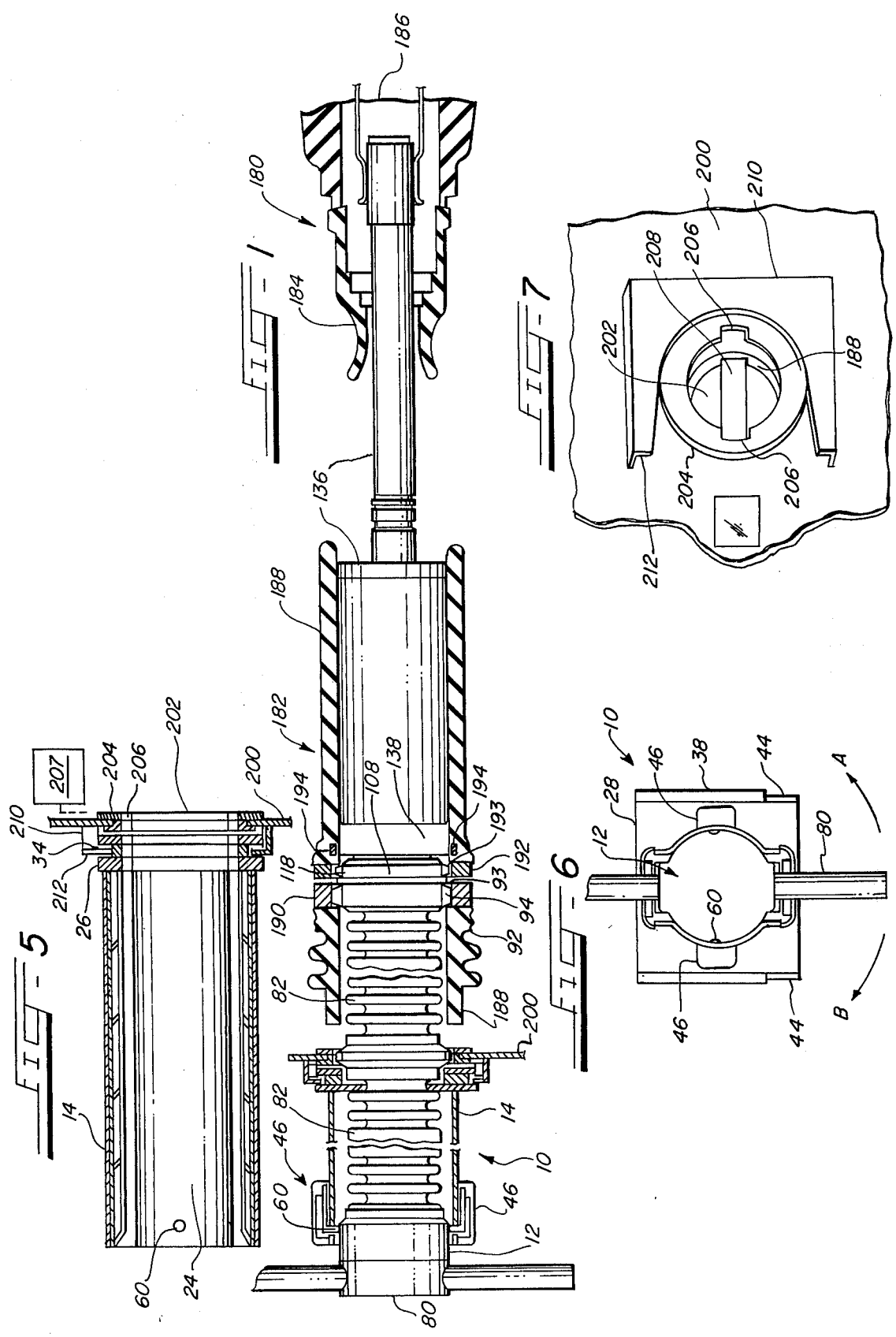

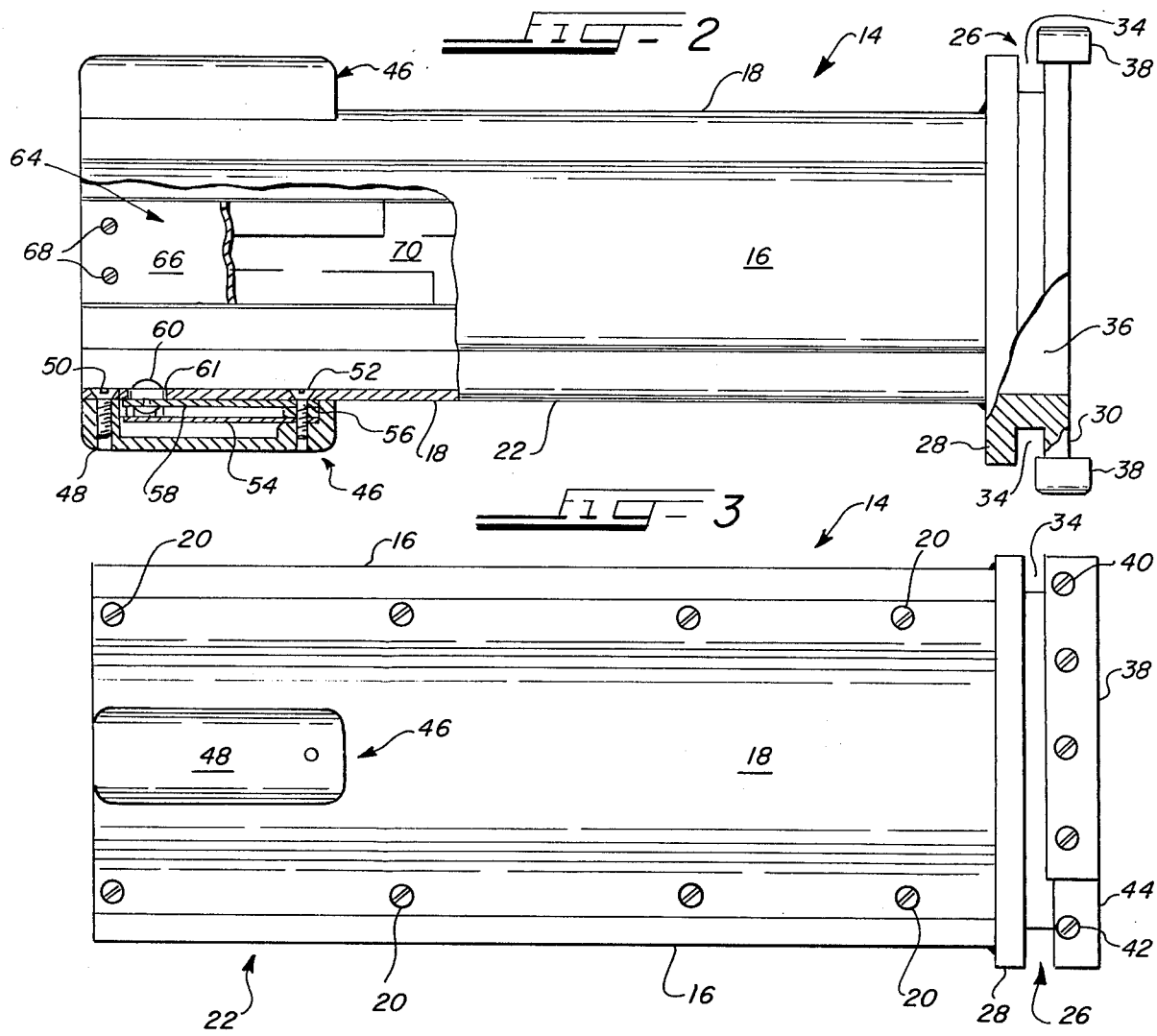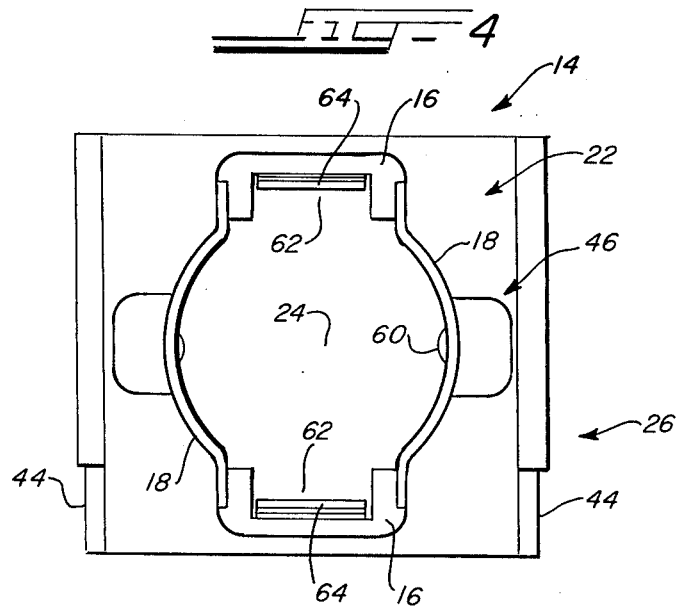

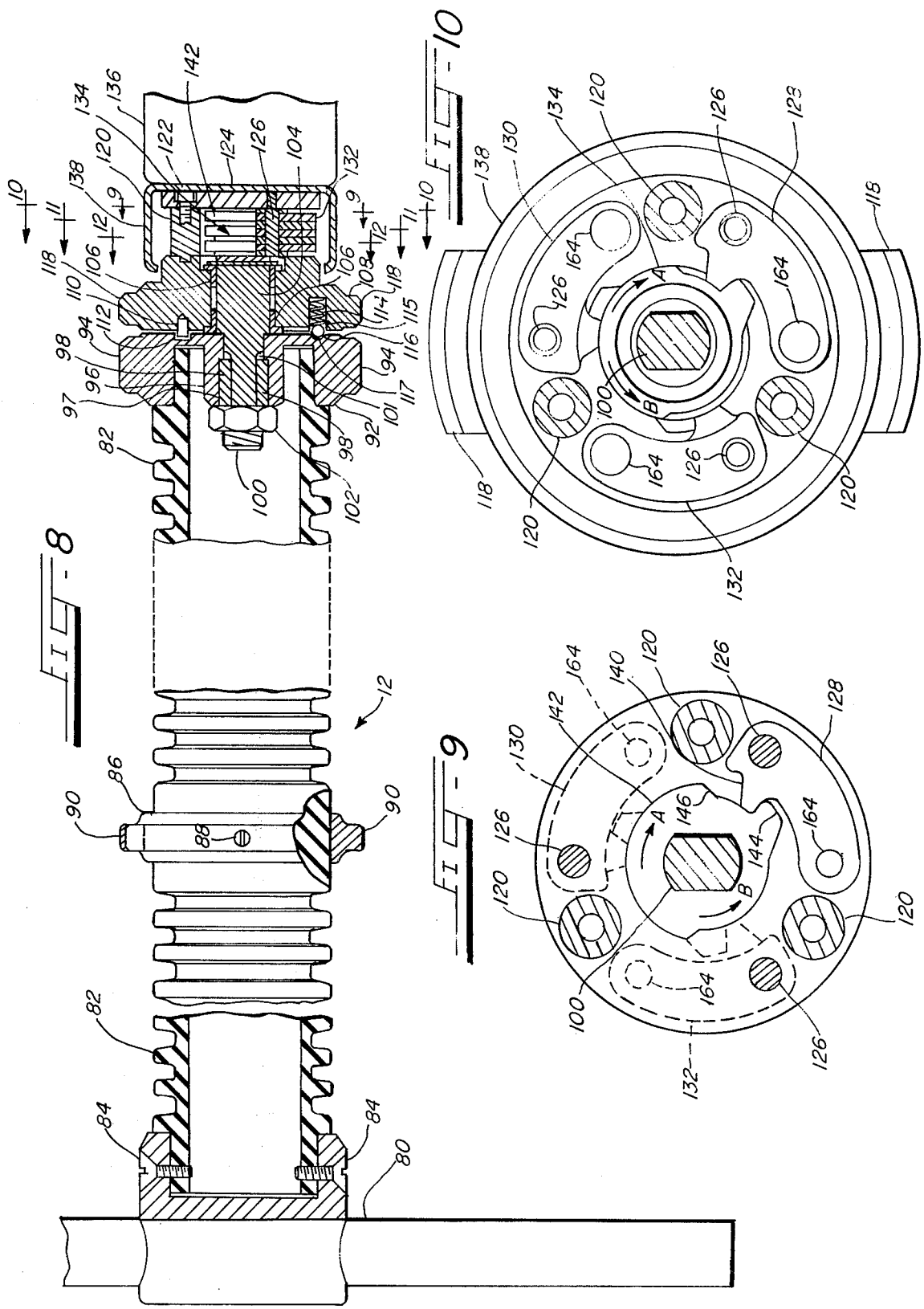

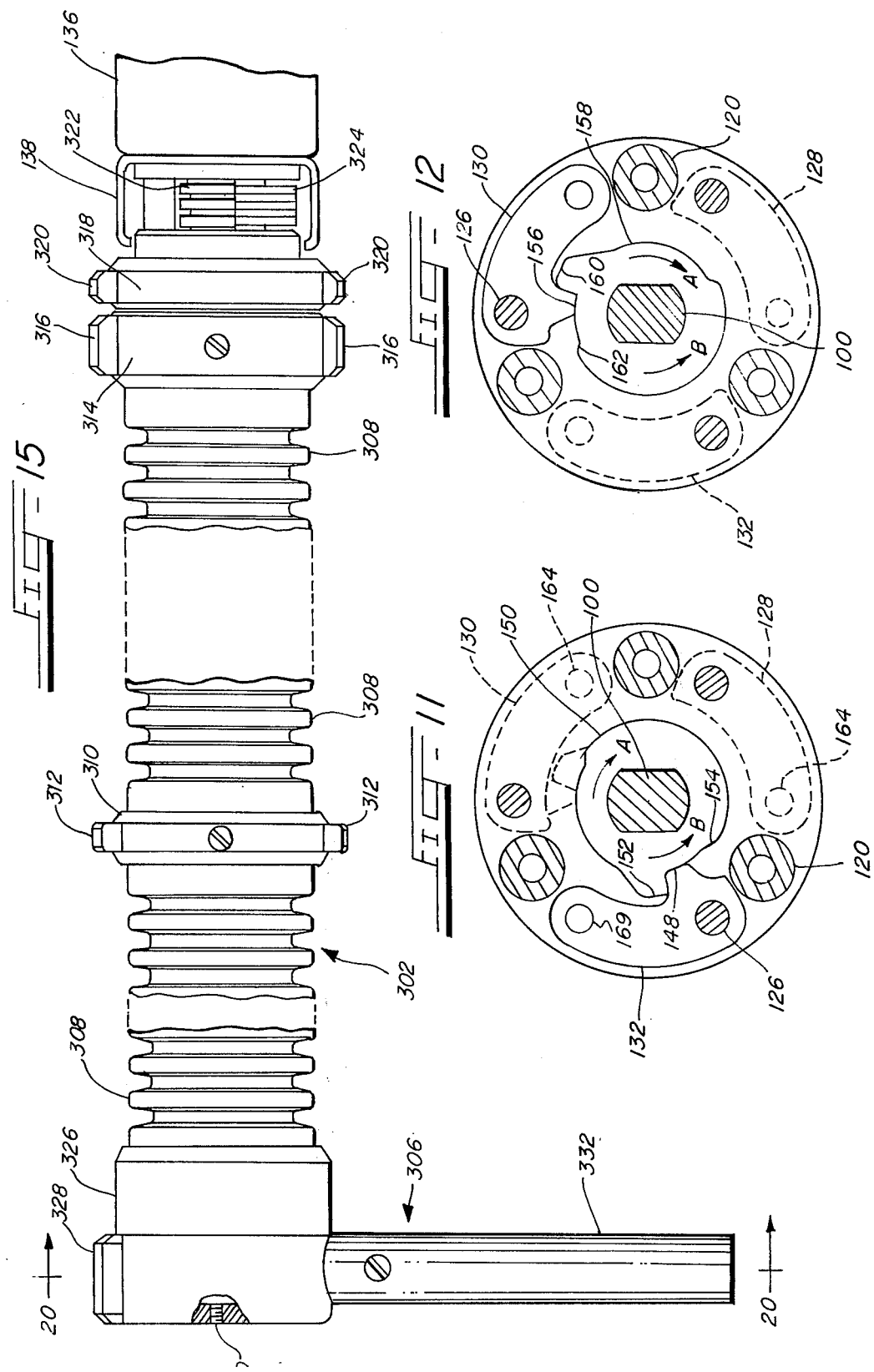

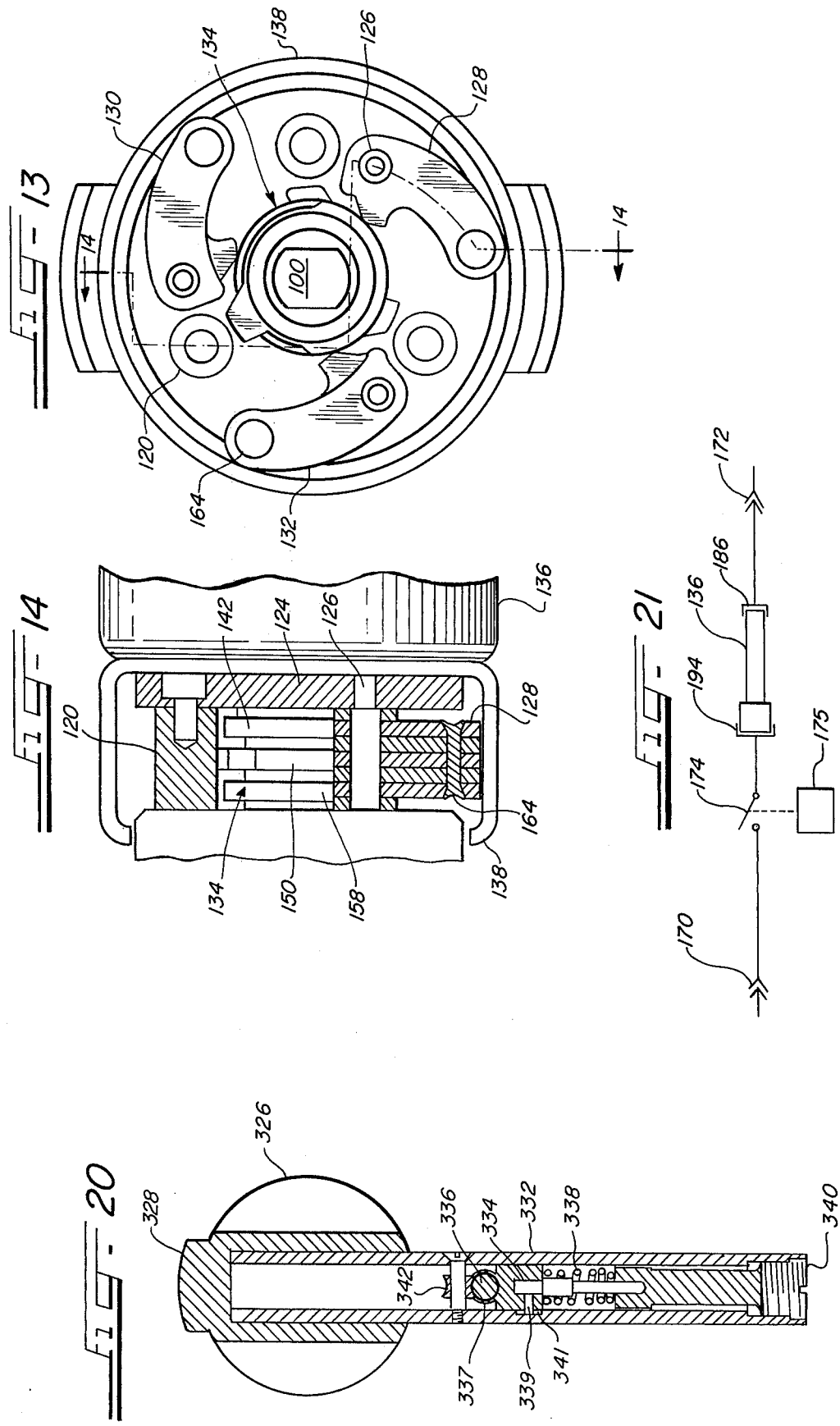

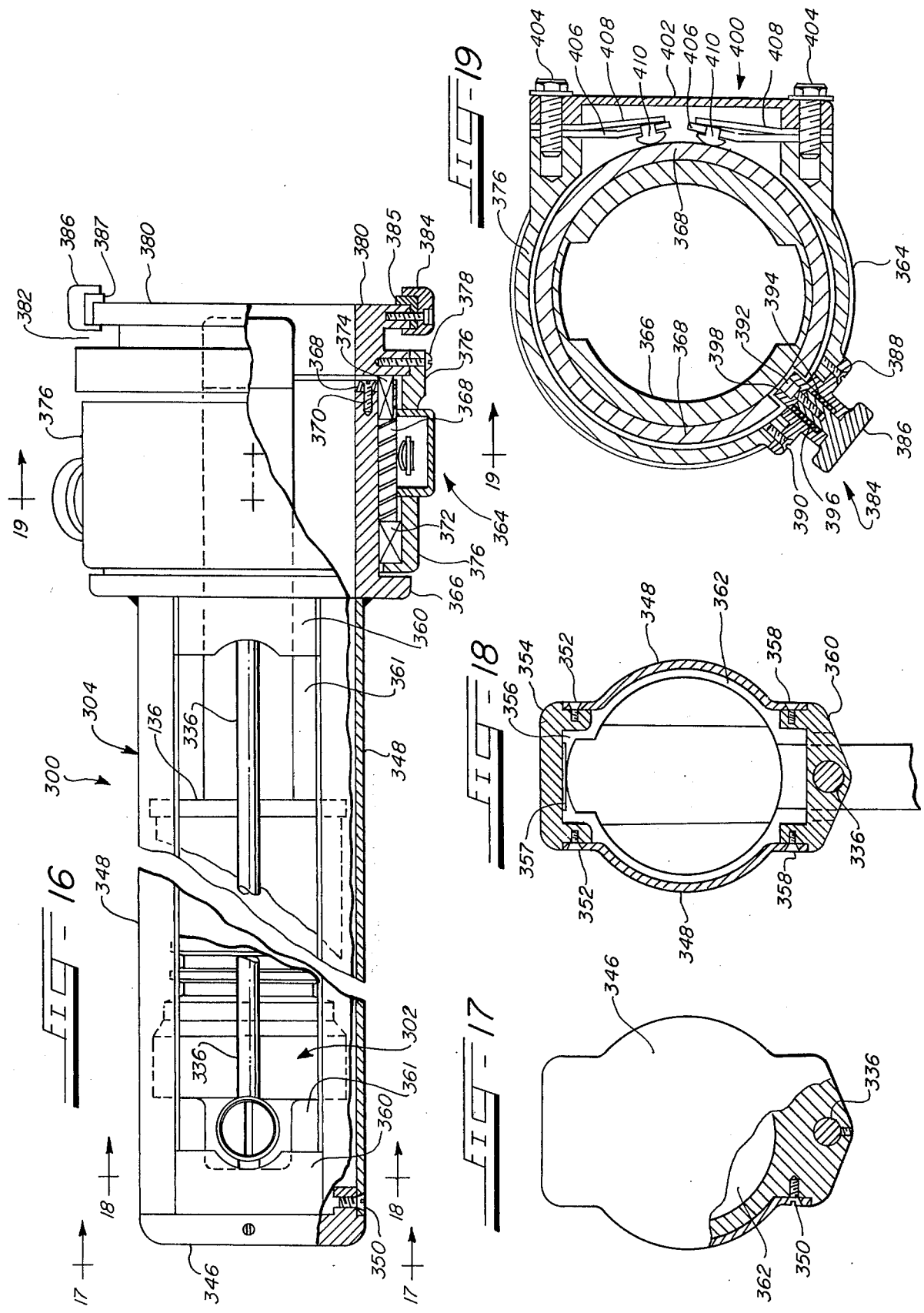

FUSE HANDLING TOOL

BACKGROUND OF THE INVENTION

1. Field of the Invention

The present invention relates to tools for removing and installing fuses in high voltage metal-enclosed switchgear, and more particularly, the present invention relates to a unique tool for permitting removal and installation of fuses in high voltage metal-enclosed switchgear that isolates the tool operator from the charged electrical portions within the metal-enclosed switchgear.

2. Description of the Prior Art

Various arrangements for removing and installing fuses in high voltage metal-enclosed switchgear are known in the art. For example, U.S. Pat. No. 3,576,509 - Bernatt, entitled "METAL-ENCLOSED LOOP SWITCHES WITH DRAWOUT FUSES, FUSE ISOLATOR SWITCHES AND GROUND SWITCHES", issued Apr. 27, 1971 and assigned to the same assignee as the present invention illustrates one type of drawer mounted fuse arrangement which permits the fuses to be removed for testing and/or replacement by sliding a drawer out of the metal-enclosed switchgear. Similarly, U.S. Pat. No. 3,573,559 - Rogers, entitled "INTERLOCKING FUSE AND SWITCH SYSTEM FOR DISTRIBUTION OF ELECTRICAL POWER" and assigned to the same assignee as the present invention, illustrates a similar drawer mounted arrangement. Such drawer mounted arrangements do not always provide sufficient flexibility in electrically isolating and removing individual fuses from their respective circuits. Accordingly, it has been recognized that it is desirable to provide means for isolating a single fuse of a three-phase three-fuse system so that a single fuse may be removed. For example, U.S. Pat. No. 3,842,381 - Bernatt, et al., entitled "INTEGRAL FUSE AND SWITCH SUPPORT FOR METAL-ENCLOSED SWITCHGEAR," issued Oct. 15, 1974, and assigned to the same assignee as the present invention discloses such a system for permitting individual removal of individual fuses.

However, it would be a desirable advance in the art to provide a fuse handling tool which completely isolates the tool operator from the charged electrical portions on the inside of the switchgear, and which also permits the tool operator to engage the fuse and isolate the fuse from the high voltage supply circuit with a single error free operation.

BRIEF DESCRIPTION OF THE INVENTION

The present invention relates to a tool for use to remove and install fuses in high voltage metal-enclosed switchgear. The tool is adapted for use with switchgear which includes at least one fuse and at least one isolating switch and operating mechanism for isolating the fuse from a high voltage supply circuit. The metal-enclosed switchgear also includes disengageable contacts for connecting the fuse between the supply circuit and a load circuit, and a grounded metal front panel having access ports formed therethrough aligned to provide access to the fuses. Mounted to the front panel around the access ports are tool receiving receptacles.

The tool comprises an operating portion including a handle, engaging means for engaging the fuse when the operating portion is rotated in a first direction and disengaging the fuse when the operating portion is rotated in an opposite second direction. The operating portion also includes an isolating switch opening means for causing the isolating switch operating mechanism to open the isolating switch to isolate the fuse from the supply circuit when the operating portion is rotated in the first direction and for causing the isolating switch to close when the operating portion is rotated in the opposite second direction. The operating portion also includes insulating means for electrically insulating the engaging means from the handle.

The tool also comprises a hollow metal housing having a flange mounted at one end thereof for engaging the tool receiving receptable mounted on the front panel and being electrically grounded to the front panel. The hollow metal housing is dimensioned to receive the operating portion in its hollow interior and allow the operating portion to be moved through the hollow interior into access ports so that engaging means can be positioned to engage the fuse. Grounding means are also provided for grounding the handle to the hollow metal housing.

The tool may also be provided with means for operating an auxiliary apparatus such as an indicator which will indicate the condition of the isolating switch and the fuse.

Thus, it is a primary object of the present invention to provide a tool for handling fuses in high voltage metal-enclosed switchgear that simultaneously engages the fuse for removal and opens an isolator switch to isolate the fuse from the high voltage supply circuit while isolating the tool operator from the charged electrical portions of the switchgear thereby eliminating the chance of operator error when removing or installing a fuse.

It is a further object of the present invention to provide a tool for handling fuses in high voltage metal-enclosed switchgear having the portions of the tool being contacted by the tool operator electrically grounded to eliminate the possibility of electrical shock.

It is another object of the present invention to provide a tool for handling fuses in high voltage metal-enclosed switchgear that may be adapted for operation with auxiliary apparatus such as an indicator for indicating the condition of the isolating switch and the location of the fuse.

These and other objects, advantages, and features of the present invention will hereinafter appear, and for the purposes of illustration, but not of limitation, exemplary embodiments of the present invention are illustrated in the accompanying drawings.

BRIEF DESCRIPTION OF THE DRAWINGS

FIG. 1 is a side partially cross sectional, partially fragmentary view of one embodiment of the present invention illustrating the switchgear in connection with which the invention will be used.

FIG. 2 is a side partially cross sectional view of the metal housing of the preferred embodiment illustrated in FIG. 1.

FIG. 3 is a top view of the metal housing illustrated in FIG. 2.

FIG. 4 is an end view of the hollow metal housing illustrated in FIGS. 2 and 3.

FIG. 5 is a cross sectional view of the metal housing illustrated in FIGS. 2, 3, and 4 showing the housing mounted in the tool receiving receptacle on the front panel of the metal-enclosed switchgear.

FIG. 6 is an end view of the tool illustrated in FIG. 1.

FIG. 7 is an upper left front perspective view of the front panel of the metal-enclosed switchgear showing the tool receiving receptacle.

FIG. 8 is a partially cross sectional, partially fragmentary view of the operating portion of the embodiment illustrated in FIG. 1.

FIG. 9 is a cross sectional view taken substantially along line 9—9 in FIG. 8.

FIG. 10 is a cross sectional view taken substantially along line 10—10 in FIG. 8.

FIG. 11 is a cross sectional view taken substantially along line 11—11 in FIG. 8.

FIG. 12 is a cross sectional view taken substantially along line 12—12 in FIG. 8.

FIG. 13 is an end view corresponding to FIG. 10 showing the tool engaging cam follower assemblies in the fuse engaging position.

FIG. 14 is a cross sectional view taken substantially along line 14—14 in FIG. 13.

FIG. 15 is a side view of an alternative embodiment of the operating portion of the present invention.

FIG. 16 is a side partially fragmentary partially cross sectional view of an alternative embodiment of the present invention.

FIG. 17 is a partially cross sectional end view taken substantially along line 17—17 in FIG. 16.

FIG. 18 is a cross sectional partially fragmentary view taken substantially along line 18—18 in FIG. 16.

FIG. 19 is a cross sectional view taken substantially along line 19—19 in FIG. 16.

FIG. 20 is a cross sectional view taken substantially along line 20—20 in FIG. 15.

FIG. 21 is a simplified circuit diagram of the fuse and isolating switch within the metal-enclosed switchgear.

DETAILED DESCRIPTION OF THE PREFERRED EMBODIMENTS

With reference to FIGS. 1, 2, 3, 4, and 8, tool 10 comprises operating portion 12 and hollow metal housing 14.

With particular reference to FIGS. 2, 3, and 4, hollow metal housing 14 comprises side walls 16 and curved housing walls 18 mounted to one another by screws 20 to form a hollow tubular shaped assembly 22 having a hollow interior 24. Welded to one end of hollow tubular shaped assembly 22 is adapter flange assembly 26. Adapter flange assembly 26 comprises first flange 28 and second flange 30 having a recess 34 provided therebetween. A circular opening 36 (see FIG. 2) is formed through adapter flange assembly 26 which coincides with hollow interior 24 of hollow tubular shaped assembly 22. Mounted on two opposite edges of second flange 30 by screws 40 are Teflon covers 38. Also mounted on opposite edges of second flange 30 by screws 42 are contact bars 44. Mounted on the opposite end of curved housing walls 18 are housing contact assemblies 46. Housing contact assemblies 46 comprise cover 48 mounted to housing wall 18 by screws 50 and 52. Mounted inside cover 48 and held in position by screw 52 and spacer 56 is leaf spring 54 and contact assembly 58. Contact assembly 58 has a contact button 60 mounted thereon which extends through a small circular opening 61 through housing wall 18 into hollow interior 24. Leaf spring 54 biases contact assembly 58 so that button 60 is normally biased towards hollow interior 54.

Side walls 16 of housing 14 are essentially U-shaped in cross section to form a recessed groove 62 along the interior thereof. Positioned in groove 62 along the entire length of hollow tubular shaped assembly 22 is sliding contact assembly 64. Sliding contact assembly 64 comprises a thin flexible copper bar 66 mounted to side walls 16 by screws 68 which is positioned over a strip spring member 70 (see FIG. 2) which tends to bias copper bar 66 towards the center of hollow bar interior 24. Sliding contact assembly 64 provides electrical connection between housing 14 and operating portion 12 as operating portion 12 is moved through housing 14 as will be more fully explained below.

With reference to FIG. 8, operating portion 12 comprises handle assembly 80 which is mounted to tubular insulator 82 by screws 84. Positioned centrally of and around insulator 82 is an annular auxiliary ring 86. Auxiliary ring 86 is mounted on insulator 82 by screws 88. Formed on each side of auxiliary ring 86 and projecting outwardly therefrom are projections 90. Projections 90 are dimensioned to slide in groove 62 in housing 14 and engages sliding contact assembly 64.

Mounted on the opposite end of insulator 82 by screws (not shown) is switch operating ring 92. Switch operating ring 92 also has projections 94 projecting outwardly from opposite sides thereof. Projections 94 are dimensioned to slide in groove 62 and engage sliding contact assembly 64. Formed in the center and extending into the hollow interior of insulator 82 is hollow cylindrical support 96. Support 96 has key ways 97 formed on the interior thereof and keys 98 are positioned therein. Extending through the hollow interior of support 96 is shaft 100 which has formed along opposite surfaces thereof key receiving grooves 101 for receiving keys 98 so that shaft 100 cannot rotate within support 96. Shaft 100 is firmly mounted on support 96 by nut 102. Shaft 100 has an enlarged portion 104 around which are positioned annular bushings 106. A fuse ring 108 rides on bushings 106 so that fuse ring 108 can pivot around shaft 100. A pin 110 is mounted into fuse ring 108 and rides in a circular groove 112 formed in switch operating ring 92 so that fuse ring 108 can rotate through an angle no greater than 180°. A spring 114 is positioned within a hollow opening 115 in fuse ring 108 and biases a roller ball 116 against dentents 117 in the face of switch operating ring 92 so that fuse ring 108 is normally held in position at each end of its 180° angle of rotation. Fuse ring 108 also has projections 118 extending from opposite sides of fuse ring 108 which can engage sliding contact assembly 64 in groove 62.

With reference to FIGS. 8, 9, 11, and 12, cylindrical spacers 120 are mounted to the face of fuse engaging ring 108 and extended therefrom. Mounted to the end of cylindrical spacers 120 by screws 122 is cover plate 124. Mounted between cover plate 124 and fuse ring 108 are shafts 126, and pivotably mounted on shafts 126 are cam follower assemblies 128, 130, and 132 (see FIG. 10). Also mounted on a flattened end of shaft 100 is cam assembly 134. Positioned over the end of operating portion 12 is fuse 136 which has attached to the end thereof an engaging flange 138.

With reference to FIG. 9, cam follower assembly 128 is pivotably mounted by pin 126 and has a follower projection 140 that engages the surface of cam disk 142 of cam assembly 134. Cam disk 142 has a stop projection 144 extending from the periphery thereof and a cam surface 146 extending outwardly from its periphery. The remaining cam follower assemblies 130 and 132 are shown in dotted lines so as to accentuate cam follower assembly 128.

Similarly, with reference to FIG. 11, cam follower assembly 132 is pivotably mounted to shaft 126 and has a follower projection 148 extending therefrom that engages the surface of cam disk 150 of cam assembly 134. Cam disk 150 has a stop projection 152 extending from the periphery thereof and a cam surface 154 extending outwardly from its periphery. Cam assemblies 128 and 130 are shown in dotted lines so as to accentuate cam assembly 132.

With reference to FIG. 12, cam follower assembly 130 is pivotably mounted by shaft 126 and has a follower projection 156 extending therefrom that engages the surface of cam disk 158 of cam assembly 134. Cam disk 158 has a stop projection 160 extending from the periphery thereof and a cam surface 162 extending outwardly from its periphery. Cam assemblies 128 and 132 are shown in dotted lines to accentuate cam assembly 130.

Each of cam disks 142, 150, and 158 are formed to mate with and be mounted on the flattened end of shaft 100 so that they will not rotate around shaft 100. Each of cam follower assemblies 128, 130, and 132 comprises five separate flat plate members which are held together by rivets 164.

Tool 10 is designed and adapted to be utilized to manipulate fuses such as fuse 136 out of and into metal-enclosed switchgear. With reference to FIG. 21, a simplified circuit diagram of a single phase of circuitry typically included within metal-enclosed switchgear is illustrated. Usually three parallel circuits are provided for each of three AC supply phases. Fuse 136 is serially removably mounted between first and second contacts 186 and 194, and is connected between a supply circuit terminal 170 and a load circuit terminal 172. High voltage AC electrical current is supplied at terminal 170. An isolating switch 174 is normally closed so that a circuit is completed from the supply circuit terminal 170 to the load circuit terminal 172 through fuse 136. Fuse 136 operates to interrupt current flow if a fault condition occurs.

However, isolating switch 174 may be opened by the operation of isolating switch operating mechanism 175 to interrupt any normal current to the load circuit to isolate fuse 136 from the high voltage supply circuit so that fuse 136 can be removed for testing and/or replacement.

With reference to FIG. 1, fuse 136 is typically mounted within metal-enclosed switchgear between a first contact assembly 180 and a second contact assembly 182. First contact assembly 180 may take a variety of forms but typically comprises an insulated sleeve 184 which surrounds metal fuse engaging contact 186 which are connected to the load circuit. Second fuse contact assembly 182 comprises a hollow insulator sleeve 188. Positioned on the interior of hollow insulator sleeve 188 is switch operating member 190 which is a part of isolating switch operating mechanism 175, and fuse ring engaging member 192. Also positioned within hollow insulated sleeve 188 are fuse contacts 194 which are connected to one side of the isolating switch 174.

With reference to FIGS. 1, 5, and 7, the metal-enclosed switchgear also comprises a front panel 200 having a circular access port 202 formed therethrough aligned with the hollow interior of hollow insulator sleeve 188. Mounted for rotation in access port 202 is ring member 204 having a circular opening therethrough coinciding with access port 202, and grooves 206 formed along opposite edges of that opening (see FIG. 7) dimensioned to receive the projections 90, 94, and 118 on operating portion 12. Positioned immediately behind access port 202 is insulator sleeve 188 which similarly has grooves 208 formed on the interior surfaces dimensioned to receive projections 94 and 118 on operating portion 12.

Mounted to front panel 200 around access port 202 is tool receiving receptacle 210 which is open on one side and has a flange plate 212 dimensioned and formed to be received into recess 34 of adapter flange assembly 26.

With reference to FIGS. 1, 5, and 7, operation of tool 10 is commenced by inserting housing 14 into tool receiving receptacle 210 until adapter flange assembly 26 is against the back of tool receiving receptacle 210 (see FIG. 5). In this position, the hollow interior 24 of hollow metal housing 14 aligns with access port 202 (see FIG. 5). With hollow metal housing 14 in this position, operating portion 12 can be inserted into the hollow interior 24 of metal housing 14 until the end of operating portion 12 is in contact with engaging flange 138 on fuse 136 (see FIG. 1). As operating portion 12 is inserted through housing 14, projections 90, 94, and 118 engage sliding contact assembly 64 grounding these members while they pass through housing 14. In the fully inserted position, projection 118 on fuse ring 108 engages grooves 193 on fuse ring engaging member 192 which holds fuse engaging arrangement 108 in a stationary position so that it cannot be rotated. When operating portion 12 is rotated in the direction of arrow A in FIG. 6, all of operating portion 12 rotates except for fuse ring 108.

With reference to FIGS. 9, 10, and 12, the rotation of operating portion 12 in the direction of arrow A causes cam disks 142, 150 and 158 of cam assembly 134 to rotate in the direction of arrow A in those figures. This rotation causes cam surfaces 146, 154, and 162 to engage follower projections 140, 152, and 156 causing cam assemblies 128, 130, and 132 to pivot outwardly to the position illustrated in FIG. 13. In this position, cam assemblies 128, 130, and 132 will engage the engaging flange 138 on fuse 136. Thus, when operating portion 12 is rotated through an angle of 180°, fuse 136 is engaged so that it can be withdrawn from fuse engaging contact 186 of first contact assembly 180 and extracted through hollow insulated sleeve 188 through access port 202 as operating portion 12 is pulled out of hollow metal housing 14.

Projections 94 on switch operating ring 92 engage mating indentations 93 on switch operating member 190 so that as operating portion 12 is rotated, switch operating member 190 is also rotated. Switch operating member 190 is a part of isolating switch operating mechanism 175 which causes isolating switch 174 to open when switch operating ring 92 is rotated to isolate the fuse 136 from the high voltage electrical supply circuit. Thus, rotation of operation portion 12 through an angle of 180° not only causes engagement of fuse 136, but also causes the isolating switch 174 to open so that the fuse 136 can be removed without causing an electrical arc to be created. The exact structure of isolating switch operating mechanism 175 which operates isolating switch 174 does not form a part of the present invention and is the subject of a separate co-pending aplication assigned to the same assignee as the present invention. However, many different operating mechanisms may be utilized in conjunction with the present invention provided the mechanism will operate in conjunction with operating portion 12 so that rotation of operating portion 12 will cause the isolating switch 174 to open when the operating portion 12 is rotated through an angle of 180°.

Projections 90 on auxiliary ring 86 engage the grooves 206 in ring member 204 mounted for rotation in access port 202 so that rotation of operating portion 12 causes ring member 204 to rotate through the same 180° angular displacement. Ring member 204 may be operably connected to an auxiliary apparatus 207 for indicating the condition of the isolating switch and the fuse in the metal-enclosed switchgear (e.g., whether isolating switch 174 is open or closed and whether fuse 136 is installed). The exact structure of auxiliary apparatus 207 is disclosed in a separate co-pending application assigned to the assignee of the present invention and does not form a part of the present invention. Thus, tool 100 may be utilized to operate an auxiliary apparatus such as an apparatus 207 to indicate the condition of the isolating switch and fuse.

It should be noted that when hollow metal housing 14 is inserted into tool receiving receptacle 210, hollow metal housing 14 makes electrical connection through contact bars 44 to front panel 200. Front panel 200 which comprises part of the metal-enclosed switchgear is grounded so that it remains at ground potential. Thus, when hollow metal housing 14 is positioned in tool receiving receptacle 210, hollow metal housing 14 is also at ground potential. Similarly, as operating portion 12 is inserted through the hollow interior 24 of hollow metal housing 14, the projections 90, 94, and 118 on auxiliary ring 86, switch operating ring 92, and fuse ring 108 maintain a sliding contact with sliding contact assembly 64. As long as these projections remain in contact with sliding contact assembly 64, these members remain at the ground potential.

Once operating portion 12 is fully inserted into the metal-enclosed switchgear as illustrated in FIG. 1, handle assembly 80 engages contact button 60 of housing contact assembly 46 thereby electrically grounding handle assembly 80. Thus, it is virtually impossible for the tool operator to come in contact with charged electrical portions of the metal-enclosed switchgear. Further, insulator 84 insulates handle assembly 80 from the charged electrical portions on the inside of the metal-enclosed switchgear.

Once isolating switch 174 has been opened and fuse 136 has been withdrawn from the metal-enclosed switchgear, the fuse can be examined, tested, and/or replaced if necessary. To reinsert fuse 136 into the metal-enclosed switchgear, the fuse 136 is attached to the end of operating portion 12 by placing the fuse over the end of operating portion 12 and rotating fuse ring 108 until cam assemblies 128, 130, and 132 engage engaging flange 138. If metal housing 14 has been removed from receptacle 210 while the fuse was being examined and tested, housing 14 is reinserted into receptacle 210, and the fuse 136 and operating portion 12 are inserted into the hollow interior 24 of metal housing 14. Operating portion 12 is then pushed all the way into housing 14 until fuse 136 engages contact 186 as illustrated in FIG. 1. Operating portion 12 is then rotated in the opposite direction through an angle of 180° (in the direction of arrow B in FIG. 6) so that cam assembly 134 rotates in the direction of arrow B in FIGS. 9, 10, 11, and 12 so that cam follower assemblies 128, 130, and 132 pivot back to the position illustrated in FIGS. 9, 10, 11, and 12 as stop projections 144, 152, and 160 engage follower projections 140, 148, and 156. In this position, operating portion 12 no longer engages fuse 136 so that operating portion 12 may be removed leaving fuse 136 in engagement with first and second contact assemblies 180 and 182.

Rotation of operating portion 12 back through an angle of 180° causes projection 94 on switch operating ring 92 to rotate switch operating member 190 through the same angular displacement. This rotation of switch operating member 190 causes isolating switch operating mechanism 175 to close isolating switch 174 thereby connecting fuse 136 back to the high voltage electrical supply circuit.

Fuse contacts 194 may either by spring biased to engage fuse 136 or may be operably connected to isolating switch operating mechanism 175 so that rotation of switch operating member 190 causes fuse contacts 194 to disengage fuse 136 when the isolating switch 174 is opened and to engage fuse 136 when isolating switch 174 is closed. The exact mechanism for operating fuse contacts 194 does not form a part of the present inention and is the subject of a separate co-pending application assigned to the same assignee as the present invention.

With reference to FIGS. 15, 16, 17, 18, 19, and 20, an alternative embodiment of the present invention is illustrated. Tool 300 comprises operating portion 302 (see FIG. 15) and hollow metal housing 304 (see FIG. 16).

Operating portion 302 is substantially similar to the operating portion 12 of the previous embodiment and comprises a handle assembly 306 mounted to a tubular insulator 308. Mounted centrally of insulator 308 is auxiliary ring 310 having projections 312 extending from opposite sides thereof. Mounted to the end of insulator 308 is switch operating ring 314 having projections 316 extending from opposite sides thereof. Also mounted to the end of operating portion 302 is fuse ring 318 having projections 320 extending from opposite sides thereof. Also mounted to fuse ring 318 in the same manner previously described with respect to the previous embodiment are cam assembly 322 and cam follower assemblies 324. Fuse engaging ring 318, cam assembly 322 and cam follower assemblies 324 operate in exactly the same manner as previously described with respect to the previous embodiment to grip the engaging flange 138 on fuse 136 when operating portion 302 is rotated.

Handle assembly 306 in the present embodiment has been modified. With reference to FIGS. 15 and 20, handle assembly 306 comprises cylindrical body 326 having a projection 328 extending from one side thereof. Mounted in cylindrical body 326 by set screw 330 is hollow tubular grip 332.

Positioned within the hollow interior of tubular grip 332 (see FIG. 20) is sliding contact 334. Sliding contact 334 is biased by spring 338 against contact rod 336 which extends through opening 337 in grip 332 and is prevented from rotating by pin 339 which rides in groove 341. The pressure exerted by spring 338 may be adjusted by rotating spring stud 340 which is thread mounted into the end of tubular grip 332. Contact rod 336 also presses against roller 342 which is rotatably mounted by screw 344.

Operating portion 302 is permanently mounted within hollow metal housing 304 which is long enough to accommodate both operating portion 302 and fuse 136 (see FIG. 16). Hollow metal housing 304 comprises end wall 346 and curved side walls 348 mounted to end wall 346 by screws 350. Also mounted to curved side walls 348 by screws 352 is U-shaped wall 354. U-shaped wall 354 has a groove 356 formed therein dimensioned to receive the projection 328 and the other projections on the operating portion 302. Also positioned along groove 356 is a sliding contact assembly 357 that engages the projections on the operating portion 302 in the same manner as described with respect to the previous embodiment. Mounted to curved side walls 348 by screws 358 are end stops 360. Thus, metal housing 304 has a hollow interior 362 extending throughout its length, and an open side 361 extending along one side thereof.

Mounted to the opposite end of side walls 348 is rotating flange head assembly 364. Rotating flange head assembly 364 comprises cylindrical end plate member 366 that is mounted to curved side walls 348 and U-shaped wall 354 by welding or any other appropriate means. A cylindrical sleeve 368 is mounted to the end of cylindrical end plate member 366 by screws 370. Cylindrical sleeve 368 positions bearing blocks 372 and 374 against cylindrical end plate member 366. Positioned around end plate member 366 and cylindrical sleeve 368 is bearing housing 376. Mounted to the end of bearing housing 376 by screws 378 is adapter plate 380. Adapter plate 380 is rectangular in shape and has a recess 382 dimensioned to receive flange plate 212 of receptacle 210. Mounted on the edge of adapter plate 380 are Teflon covers 384 and 386, and contact members 385 and 387.

Bearing housing 376 and adapter plate 380 are rotatable around cylindrical end plate member 366. Mounted on the periphery of bearing housing 376 is pull-knob assembly 384. Pull-knob assembly 384 comprises pull-knob 386 mounted through an opening in latch support member 388 which is mounted to bearing housing 376 by screws 390. Mounted on the interior end of pull-knob 386 by screw 392 is lock pin 394. Positioned inside support member 388 around pull-knob 386 is spring 396. Spring 396 biases pull-knob 386 and latch pin 394 toward the center of housing 304 so that latch pin 394 engages a circular opening 398 in cylindrical sleeve 368. Thus, bearing housing 376 and adapter plate 380 cannot be rotated with respect to cylindrical end plate 366 until pull-knob 386 is moved outwardly so that lock pin 394 disengages circular opening 398.

Also mounted to bearing housing 376 is contact assembly 400. Contact assembly 400 comprises cover plate 402 which is mounted to bearing housing 376 by bolts 404. Bolts 404 also retain contact arms 406 and contact springs 408. Mounted on the end of contact arms 406 are contact buttons 410 which slidably contact cylindrical sleeve 368 so that a positive electrical connection is maintained between bearing housing 376 and sleeve 368 as the latter is rotated.

Housing 304 has an open side 361 between cylindrical side walls 348 and end stops 360, and contact rod 336 is mounted so that it extends along the length of this open side 361. Operating portion 302 is positioned wihin the hollow interior 362 of housing 304 so that contact rod 336 extends through opening 337 in tubular grip 332 and engages sliding contact 334 and roller 342 as illustrated in FIG. 20. Thus, as operating portion 304 is moved through the hollow interior of housing 304, the handle assembly 306 is always in electrical engagement with contact rod 336.

Operation of tool 300 is substantially the same as the operation of the previous embodiment. Adapter plate 380 is inserted into tool receiving receptacle 210 in the manner previously described so that the hollow interior 362 of housing 304 is aligned with access port 202 when adapter 380 is received by receptacle 210, and adapter plate 280 is electrically connected to front panel 200. Since front panel 200 is at ground potential, adapter plate 380 and bearing housing 376 are similarly at ground potential. Since contact buttons 410 engage sleeve 368, the entire housing 304 is similarly maintained at ground potential so that the handle assembly 306 is maintained at ground potential through sliding contact 334.

Once housing 304 is received into receptacle 210, operating portion 302 can be moved into the access port 202 until the end of operating portion 302 contacts fuse 136 in the same manner as previously described with respect to the prior embodiment. Once operating portion 302 is positioned against the end of fuse 136, the tool operator can withdraw pull-knob 386 so that the pin 304 disengages opening 398 in sleeve 368 so tool 300 can be rotated within bearing housing 376 through an angle of 180°. This rotation causes the end of operating portion 302 to engage the fuse as previously described and to open the isolating switch 174 as previously described. Once the operating portion 302 and housing 304 have been rotated through an angle of 180°, the operating portion 302 can be moved back through housing 304 to extract fuse 136. In the present embodiment, fuse 136 is completely drawn into housing 304 as illustrated in FIG. 16. At this time, the tool 300 is removed from the tool receiving receptacle 210 so that the fuse can be tested and/or replaced.

To reinsert fuse 136 back into the metal-enclosed switchgear, operating portion 302 is moved forward within housing 304 until enough of the end thereof is exposed to permit fuse 136 to be attached to the end of operating portion 302. Operating portion 302 and fuse 136 are then drawn back into housing 304 to the position illustrated in FIG. 16. Tool 300 is then inserted into tool receiving receptacle 210, and the operating portion is moved forward until the fuse is in the proper position. At this time, housing 304 is rotated back through an angle of 180° thereby disengaging fuse 136 and closing isolating switch 174 as previously described.

In this embodiment, as well as the previous embodiment, projection 312 on auxiliary ring 310 can engage grooves 206 in ring member 204 to rotate ring member 204 as the tool 300 is rotated. Thus, tool 300 can be utilized to operate an auxiliary apparatus 207 has previously described.

Thus, it can be seen that many advantageous features are provided by the present invention. The present invention provides a tool which completely isolates the tool operator from the charged electrical portions of the inside of the metal switchgear by grounding the metal enclosure and the tool handle. Further, the present invention provides a tool which eliminates the chances of operator error when installing or removing a fuse. In addition, the present invention provides a tool which may be simultaneously used to remove a fuse from metal-enclosed switchgear, isolate the fuse from the supply circuit by opening an isolating switch and may be utilized to operate auxiliary apparatus such as an indicating arrangement to indicate the condition of the isolating switch and the fuse.

It should be expressly understood that various changes, alterations, and modifications of the structure described herein may be made to the present invention without departing from the spirit and scope of the present invention as defined in the appended claim. For example, the tool in accordance with the present invention could be used in connection with switch gear of the type illustrated in U.S. Pat. No. 3,842,381 - Bernatt et al., which uses independently operated isolating switches. In such an arrangement, the isolating switches would have to be operated before the tool is inserted, but the other features of the present invention such as isolation of the tool operator from the charged electrical portions of the switchgear would be present.

We claim:

1. A tool for use to remove and install fuses in high voltage metalenclosed switchgear, the switchgear including at least one fuse, at least one isolating switch and operating mechanism for isolating each fuse from a high voltage supply circuit, disengageable contacts for connecting each fuse between the supply circuit and a load circuit, a grounded metal front panel having an access port formed therethrough aligned to provide access to each of the fuses, and a tool receiving receptacle mounted on the front panel adjacent the access port; said tool comprising:

an operating portion including:
a handle;
engaging means for engaging the fuse when said engaging means is moved against said fuse and said operating portion is rotated in a first direction so that said fuse can be removed from the contacts and disengaging the fuse when said operating portion is rotated in an opposite second direction;
switch operating means for causing the isolating switch operating mechanism to open the isolating switch to isolate the fuse from the supply circuit when the operating portion is rotated in the first direction and for causing the isolating switch to close when the operating portion is rotated in the second direction;
insulating means for electrically insulating said engaging means from said handle;
a hollow metal housing having a hollow interior and having a receptacle engaging means mounted at one end thereof for engaging the tool receiving receptacle mounted on the front panel and being electrically connected to the grounded front panel, said hollow metal housing dimensioned to receive said operating portion in its hollow interior and allow said operating portion to be moved through the hollow interior through said access port so that said engaging means can engage the fuse;
connecting means for grounding said handle to said hollow metal housing.

2. A tool, as claimed in claim 1, further comprising means for operating an auxiliary apparatus to indicate the condition of the isolating switch and the location of the fuse.

3. A tool, as claimed in claim 1, wherein said engaging means comprises:
cam means mounted on the end of said operating portion;
cam follower means mounted to engage and follow said cam means;
means for causing said cam meanns to move in relation to said cam follower means so that said cam follower means will move to engage the fuse when said operating portion is rotated in the first direction, and disengage the fuse when the operating portion is moved in the second direction.

4. A tool, as claimed in claim 1, wherein said switch operating means comprises projections on said operating portion that engage the isolating switch operating mechanism so that rotation of the operating portion in the first direction causes the isolating switch to open, and rotation of the operating portion in the second direction causes the isolating switch to close.

5. A tool, as claimed in claim 1, wherein said connecting means comprises a spring biased contact button mounted on said hollow metal housing that electrically engages said handle.

6. A tool, as claimed in claim 1, wherein said connecting means comprises:
a contact rod positioned along said housing; and
a sliding contact mounted on said handle for engaging said contact rod as said handle is moved within said housing.

7. A tool, as claimed in claim 1, wherein said receptacle engaging means is rotatably mounted on the end of said hollow metal housing so that said housing can be rotated with respect to said receptacle engaging means.

8. A tool, as claimed in claim 7, further comprising stop means for normally engaging said receptacle engaging means to prevent rotation of said housing with respect to said receptacle engaging means, said stop means being disengageable to permit said housing to be rotated with respect to said receptacle engaging means.

9. A tool, as claimed in claim 7, further comprising contact means for maintaining electrical contact between said housing and said receptacle engaging means as they are rotated to one another.

10. A tool for use to remove and install fuses in high voltage metalenclosed switchgear, the switchgear including at least one fuse, at least one isolating switch and operating mechanism for isolating each fuse from a high voltage supply circuit, disengageable contacts for connecting each fuse between the supply circuit and a load circuit, a grounded metal front panel having an access port formed therethrough aligned to provide access to each of the fuses, and a tool receiving receptacle mounted on the front panel adjacent the access port; said tool comprising:

an operating portion including:
a handle;
a cylindrical insulator mounted at one end to said handle;
a switch operating ring mounted on the opposite end of said insulator, said switch operating ring having projections extending from opposite sides thereof for engaging the isolating switch operating mechanism so that rotation of said operating portion in a first direction caused the isolating switch to open to isolate the fuse from the supply circuit and rotation of said operating portion in an opposite second direction causes the isolating switch to close;
a shaft extending from said switch operating ring;
a fuse ring rotatably mounted to said shaft extending from said switch operating ring, said fuse ring having projection means extending from opposite sides thereof for holding said fuse ring in a stationary position when said operating portion is rotated;

cam means rigidly mounted on said shaft having cam surfaces extending therefrom;

cam follower means pivotably mounted on said fuse engaging ring and positioned to follow said cam surfaces on said cam means so that rotation of said cam means with respect to said cam follower means in the first direction will cause said cam follower means to pivot to engage the fuse so that said fuse can be removed from the contacts, and rotation of said cam means with respect to said cam follower means in the second direction will cause said cam follower means to pivot to disengage said fuse;

a hollow metal housing having a hollow interior and having a receptacle engaging means mounted at one end thereof for engaging the tool receiving receptacle on the front panel and being electrically connected to the grounded front panel, said hollow metal housing dimensioned to receive said operating portion in its hollow interior and allow said operating to be moved through the hollow interior into said access port so that said cam follower means can engage the fuse;

connecting means for grounding said handle to said hollow metal housing.

11. A tool, as claimed in claim 10, further comprising means for operating auxiliary apparatus to indicate the condition of the isolating switch.

12. A tool, as claimed in claim 10, wherein said connecting means comprises a spring biased contact button mounted on said hollow metal housing that electrically engages said handle.

13. A tool, as claimed in claim 11, further comprising slidable contact means moved in said housing for electrically engaging said projections on said switch operating ring and said fuse ring, and said means for operating auxiliary apparatus when said operating portion is moved within said housing.

14. A tool for use to remove and install fuses in high voltage metal-enclosed switchgear, the switchgear including at least one fuse, at least one isolating switch and operating mechanism for isolating each fuse from a high voltage supply circuit, disengageable contacts for connecting each fuse between the supply circuit and a load circuit, a grounded metal front panel having an access port formed therethrough aligned to provide access to each of the fuses, and a tool receiving receptacle mounted on the front panel around the access port; said tool comprising:

an operating portion including:
 a handle;
 a cylindrical insulator mounted at one end to said handle;
 a switch operating ring mounted on the opposite end of said insulator, said switch operating ring having projections extending from opposite sides thereof for engaging the isolating switch operating mechanism so that rotation of the operating portion in a first direction causes the isolating switch to open to isolate the fuse from the supply circuit and rotation of said operating portion in an opposite second direction causes the isolating switch to close;
 a shaft extending from said switch operating ring;
 a fuse ring rotatably mounted on said shaft extending from said switch operating ring, said fuse ring having projection means extending from opposite sides thereof for holding said fuse ring in a stationary position when said operating portion is rotated;

cam means rigidly mounted on said shaft having cam surfaces extending therefrom;

cam follower means pivotably mounted on said fuse engaging ring and positioned to follow said cam surfaces on said cam means so that rotation of said cam means with respect to said cam follower means in the first direction will cause said cam follower means to pivot to engage the fuse so that said fuse can be removed from the contacts, and rotation of said cam means with respect to said cam follower means in the second direction will cause said cam follower means to pivot to disengage said fuse;

a hollow metal housing having a hollow interior and having a receptacle engaging member rotatably mounted at one end thereof for engaging the tool receiving receptacle on the front panel and being electrically connected to the grounded front panel, said hollow metal housing dimensioned to receive said operating portion in its hollow interior and allow said operating portion to be moved through the hollow interior into said access port so that said cam follower means can engage the fuse;

stop means for normally preventing said receptacle engaging member from rotating with respect to said housing, said stop means being disengageable to allow said receptacle engaging member to rotate with respect to said housing;

contact means for maintaining electrical contact between said receptacle engaging member and said housing as they are rotated;

connecting means including a contact rod extending along said housing and a slidable contact mounted on said handle for slidably electrically engaging said contact rod as said handle is moved.

15. A tool, as claimed in claim 14, further comprising means for operating auxiliary apparatus to indicate the condition of the isolating switch and the fuse.

16. A tool, as claimed in claim 15, further comprising slidable contact means mounted in said housing for electrically engaging said projections on said switch operating ring and said fuse ring, and said means for operating auxiliary apparatus when said operating portion is moved within said housing.

17. A tool for use to remove and install fuses in high voltage metal-enclosed switchgear, the switchgear including at least one fuse, at least one isolating switch and operating mechanism for isolating each fuse from a high voltage supply circuit, disengageable contacts for connecting each fuse between the supply circuit and a load circuit, a grounded metal front panel having an access port formed therethrough aligned to provide access to each of the fuses, and a tool receiving receptacle mounted on the front panel adjacent the access port; said tool comprising:

an operating portion including:
 a handle;
 engaging means for engaging the fuse when said engaging means is moved against said fuse and said operating portion is rotated in a first direction so that said fuse can be removed from the contacts and disengaging the fuse when said operating portion is rotated in an opposite second direction;

insulating means for electrically insulating said engaging means from said handle;

a hollow metal housing having a hollow interior and having a receptable engaging means mounted at one end thereof for engaging the tool receiving receptacle mounted on the front panel and being electrically connected to the grounded front panel, said hollow metal housing dimensioned to receive said operating portion in its hollow interior and allow said operating portion to be moved through the hollow interior through said access port so that said engaging means can engage the fuse;

connecting means for grounding said handle to said hollow metal housing.

18. A tool, as claimed in claim 17, wherein said engaging means comprises:

cam means mounted on the end of said operating portion;

cam follower means mounted to engage and follow said cam means;

means for causing said cam means to move in relation to said cam follower means so that said cam follower means will move to engage the fuse when said operating portion is rotated in the first direction, and disengage the fuse when the operating portion is moved in the second direction.

* * * * *

UNITED STATES PATENT AND TRADEMARK OFFICE
CERTIFICATE OF CORRECTION

PATENT NO. : 3,951,015
DATED : April 20, 1976
INVENTOR(S) : David M. Evans and Edward J. Rogers It is certified that error appears in the above-identified patent and that said Letters Patent are hereby corrected as shown below:

Page 1 of 3

Column 6, line 37, after "10" insert --11--.

Column 10, line 11, "280" should read --380--.

In the drawings, Sheet 1, Figure 1, the lead line for reference numeral 92 should be redrawn to indicate the switch operating ring, as shown on attached Sheet 1 of the drawings.

In the drawings, Sheet 3, Figure 8, the lead line for reference numeral 124 should be redrawn to indicate the cover plate, as shown on attached Sheet 3 of the drawings.

In the drawings, Sheet 4, Figure 11, the reference numeral "169" should read --164--, as shown on the attached Sheet 5 of the drawings.

UNITED STATES PATENT AND TRADEMARK OFFICE
CERTIFICATE OF CORRECTION

PATENT NO. : 3,951,015
DATED : April 20, 1976
INVENTOR(S) : David M. Evans and Edward J. Rogers It is certified that error appears in the above-identified patent and that said Letters Patent are hereby corrected as shown below:

Column 6, line 61, "operation" should read --operating--.

Column 7, line 22, "100" should read --10--.

Column 9, line 66, "wihin" should read --within--.

Column 10, line 10, after "adapter" insert --plate--.

Column 11, line 21, "metalenclosed" should read --metal-enclosed--.

Column 12, line 3, "meanns" should read --means--.

Column 12, line 41, "metalenclosed" should read --metal-enclosed--.

Column 13, line 24, after "operating" insert --portion--.

UNITED STATES PATENT AND TRADEMARK OFFICE
CERTIFICATE OF CORRECTION

PATENT NO. : 3,951,015
DATED : April 20, 1976
INVENTOR(S) : David M. Evans and Edward J. Rogers It is certified that error appears in the above-identified patent and that said Letters Patent are hereby corrected as shown below:

Page 3 of 3

In the drawings, Sheet 5, Figure 20, the reference numeral 344 and the lead line should be applied to the screw, as shown on the attached Sheet 5 of the drawings.

Signed and Sealed this

Eleventh Day of July 1978

[SEAL]

Attest:

RUTH C. MASON
Attesting Officer

DONALD W. BANNER
Commissioner of Patents and Trademarks